United States Patent [19]

Shrader et al.

[11] Patent Number: 4,823,156
[45] Date of Patent: Apr. 18, 1989

[54] AUTO-FOCUS TRAVELLING LENS CAMERA FOR THREE-DIMENSIONAL PHOTOGRAPHY

[76] Inventors: Robert L. Shrader, 3158 Brent Ct., Castro Valley, Calif. 94546; Douglas F. Winnek, 28091 Robinson Canyon Rd., Carmel Valley, Calif. 93924

[21] Appl. No.: 155,863

[22] Filed: Feb. 16, 1988

[51] Int. Cl.⁴ .......................................... G03B 35/08
[52] U.S. Cl. ................................. 354/115; 354/294
[58] Field of Search ................ 354/112, 114, 115, 294

[56] References Cited

U.S. PATENT DOCUMENTS

| | | | |
|---|---|---|---|
| 3,380,360 | 4/1968 | Stockbridge et al. | 354/112 |
| 3,494,270 | 2/1970 | Shibata | 354/112 |
| 3,503,316 | 3/1970 | Takano et al. | 354/112 |
| 3,524,395 | 8/1970 | Alasia | 354/112 |
| 3,687,048 | 8/1972 | Richter | 354/112 |
| 3,731,607 | 5/1973 | Mandler | 354/294 |
| 3,769,890 | 11/1973 | Alasia | 354/112 |
| 3,800,307 | 3/1974 | Wechsler | 354/112 |
| 4,481,050 | 11/1984 | Gundlach et al. | 354/112 |
| 4,488,795 | 12/1984 | Winnek | 354/115 |

Primary Examiner—A. A. Mathews
Attorney, Agent, or Firm—David B. Harrison

[57] ABSTRACT

An improved camera apparatus for three-dimensional photography conventionally includes a stationary frame, a camera body with a film holder for holding photographic film in a film plane and a controllable shutter for exposing film held in the film holder, and a focusable lens assembly attached to the body e.g. by bellows. The improved camera apparatus further includes a camera body carriage moveably mounted to the frame along a first range of movement transverse to the field of view of the camera lens, a vertical optical grating within the camera body immediately in front of the film holder and moveable over a second limited range of transverse movement relative to position of the camera body carriage with respect to the base, a lens assembly carriage moveably mounted to the frame for moving the lens assembly over a third limited range of transverse movement relative to the frame, and a lens assembly carriage position control responsive to focus position of the lens relative to the film plane and to the relative position of the camera body carriage with respect to the frame for moving the lens assembly carriage relative to the film holder over the third limited range of movement.

9 Claims, 5 Drawing Sheets

AUTO-FOCUS TRAVELLING LENS CAMERA FOR THREE-DIMENSIONAL PHOTOGRAPHY

FIELD OF THE INVENTION

The present invention relates to camera apparatus for making three dimensional pictures. More particularly, the present invention relates to camera apparatus for automatically controlling a travelling main lens and a travelling lenticular screen or optical grating for making three dimensional stereoscopic or pseudoscopic (reverse relief) pictures throughout a range of focus of the main lens.

BACKGROUND OF THE INVENTION

Cameras for making three-dimensional images are known in the prior art. One example of the state of the prior art is depicted in co-inventor Winnek's U.S. Pat. No. 4,488,795, the disclosure of which is incorporated herein by reference thereto. In the camera described by the referenced '795 patent numerous lenses and optical components were required; and, the camera was neither inexpensive nor practically portable, as cameras must be in order to gain widespread acceptance and use.

The referenced '795 patent described the difficulties surrounding the development of a camera apparatus having a complex mounting apparatus enabling precise necessary relative movements of optical components in order to expose true three-dimensional picture images on light-sensitive picture film. Those difficulties have heretofore remained unsolved and have provided an impetus underlying the making of the present invention.

Another approach followed by the prior art was to provide a camera having a very large stationary lens, such as 18 inches in diameter. Such lenses were extremely expensive and very heavy, not lending themselves to the concept of a portable camera.

SUMMARY OF THE INVENTION

A general object of the present invention is to provide a camera apparatus for making three-dimensional photography which overcomes the limitations and the drawbacks of prior art approaches.

A specific object of the present invention is to provide a camera apparatus for making three-dimensional photography which is easy to use, which is compact, relatively light weight and which is truly portable.

Another specific object of the present invention is to provide a carriage assembly and lenticular screen or optical grating for adapting a conventional bellows camera for making three-dimensional still pictures, thereby providing additional capability for the conventional camera at relatively low additional cost.

One more specific object of the present invention is to provide a camera apparatus for making three-dimensional photographs in either stereoscopic or pseudoscopic perspective.

Yet a further specific object of the present invention is to provide a camera apparatus for making three-dimensional photographs which provides for three relative motions of elements of the apparatus with simplified mechanical linkage arrangements, thereby enabling the camera apparatus to be made at low cost and to be rugged, reliable and highly accurate in use.

An improved camera apparatus for three-dimensional photography conventionally includes a stationary frame, a camera body with a film holder for holding photographic film in a film plane and a controllable shutter for exposing film held in the film holder, and a focusable lens assembly attached to the body e.g. by bellows. The improved camera further includes:

a camera body carriage moveably mounted to the stationary frame, the carriage for securing the camera body thereto, the camera body carriage being moveable along a first limited range of substantially linear movement transverse to the field of view of the camera lens, a vertical optical grating having a predetermined number of equally spaced vertically aligned light passing means and pitch defining the spacing therebetween, said grating being disposed within the camera body immediately in front of the film holder and moveable over a second limited range of transverse movement, a grating movement control responsive to the relative position of the camera body carriage with respect to the frame for moving the grating relative to the film holder over the second limited range of movement as the camera body carriage moves throughout its range of substantially linear movement, a lens assembly carriage moveably mounted effectively to the frame, the lens assembly carriage for securing the lens assembly and transversely moveable over a third limited range of transverse movement relative to the base, and a lens assembly carriage control responsive to focus position of the lens relative to the film plane and responsive to the relative position of the camera body carriage with respect to the frame for moving the lens assembly carriage relative to the film holder over the third limited range of movement as the camera body carriage moves throughout the first limited range of substantially linear movement, the relative movement between the lens assembly carriage and the film holder being dependent upon the focus setting of the lens assembly in a range between zero relative movement at an infinity focus setting of the lens and a maximum range of relative movement at a maximum close up focus setting of the lens.

These and other objects, aspects, advantages and features of the present invention will be further understood and appreciated upon consideration of the following detailed description of a preferred embodiment, presented in conjunction with the accompanying drawings.

DETAILED DESCRIPTION OF A PREFERRED EMBODIMENT

Figure 1:
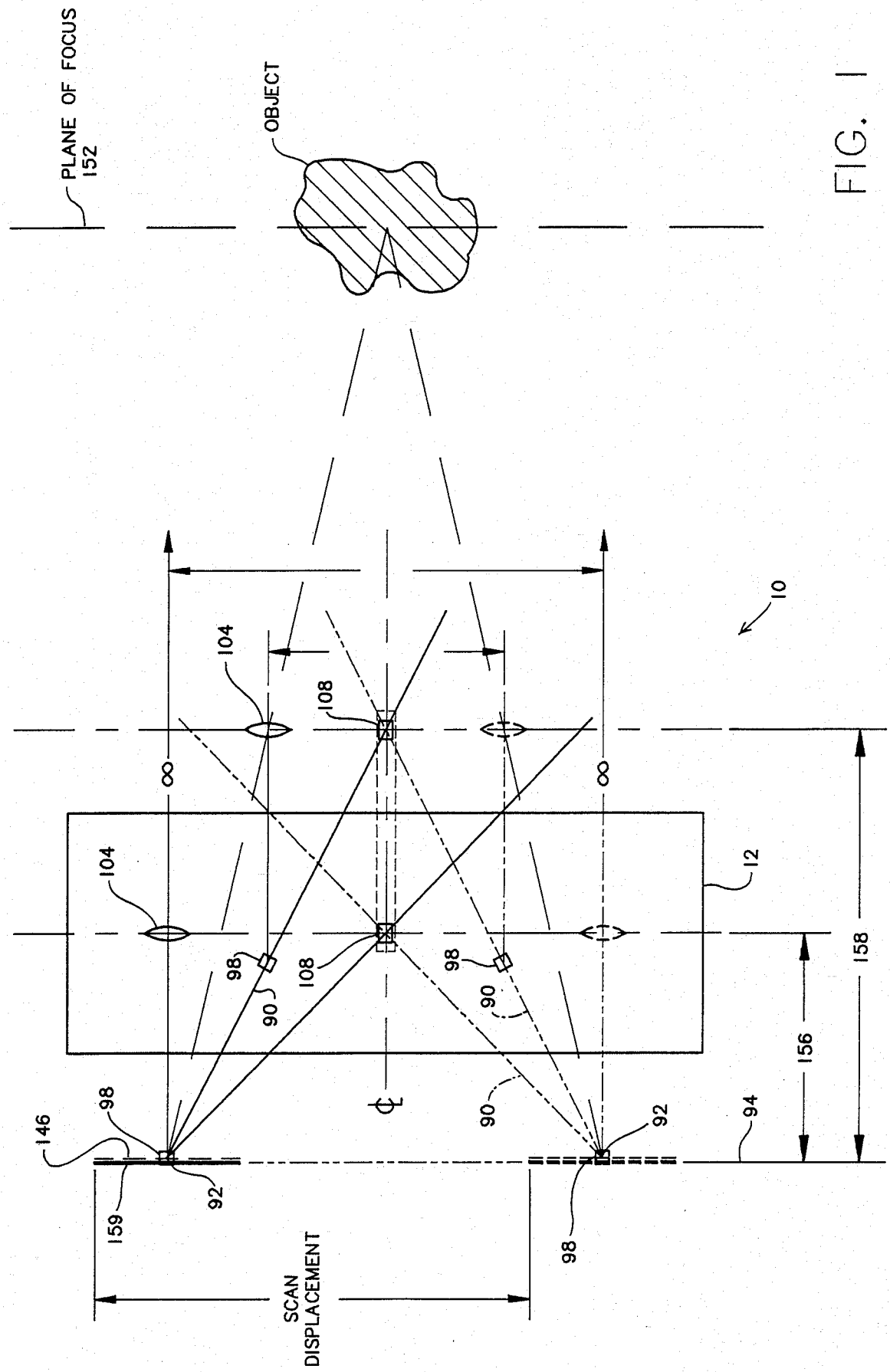
FIG. 1 is a diagrammatic plan view of the optical system employed in camera apparatus for making three-dimensional photographs in accordance with the principles of the present invention.
Figure 4:
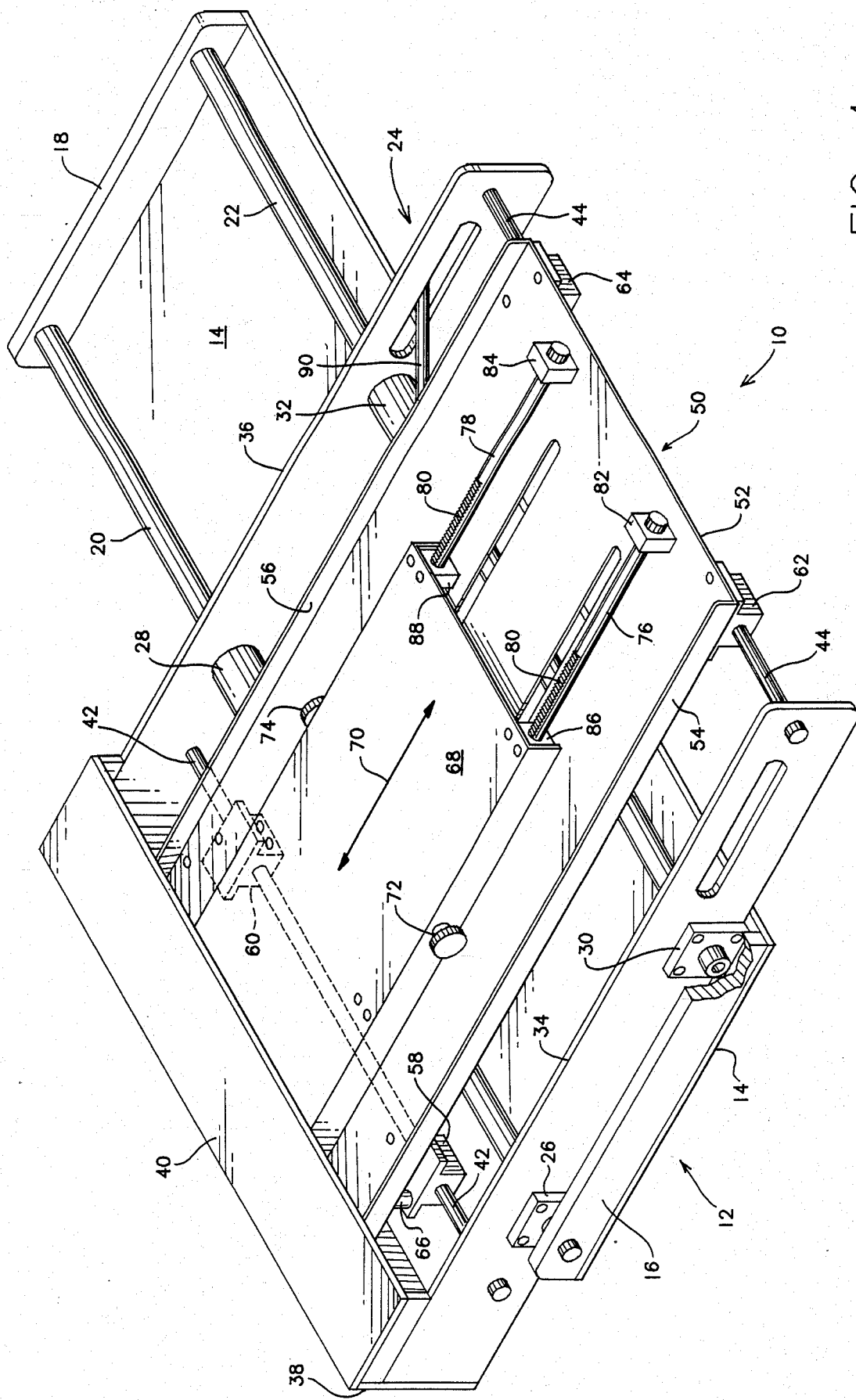
FIG. 4 is an isometric view of carriage apparatus of the camera apparatus of FIG. 1.
Figure 5:
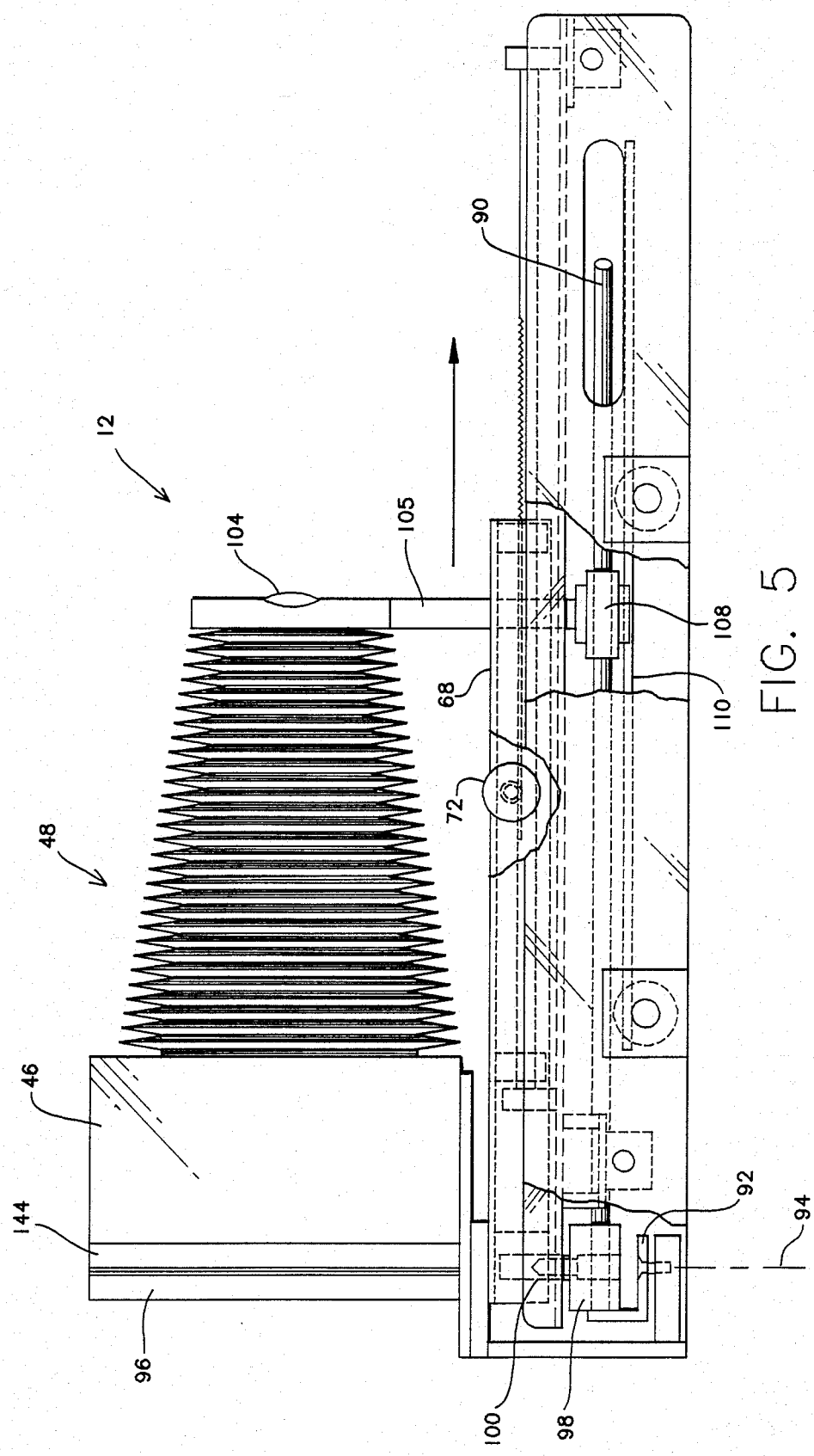
FIG. 5 is a side view in section and elevation of the carriage apparatus of FIG. 4 also depicting diagrammatically a bellows camera in conjunction therewith.
Figure 6:
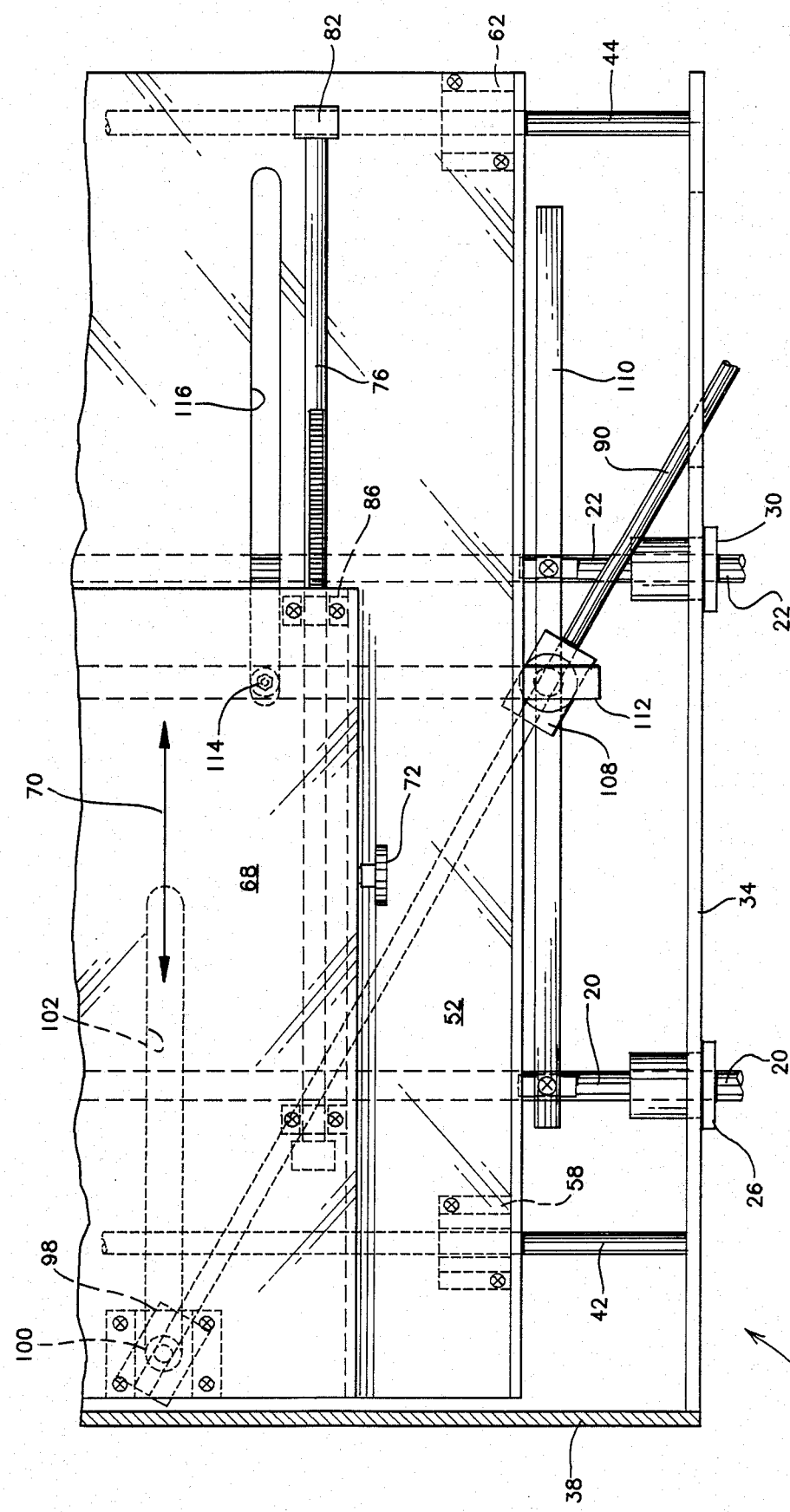
FIG. 6 is a somewhat diagrammatic top plan view of a portion of the carriage apparatus depicted in FIG. 4, illustrating important mechanical relationships of the various moving parts thereof.

FIG. 1 is a schematic plan of a three-dimensional camera system 10 incorporating the principles of the present invention. FIGS. 4 through 6 illustrate a preferred embodiment of a carriage apparatus of the system 10.

The camera apparatus 10 includes a fixed base 12, which may be mounted on a suitable camera tripod or other stand (not shown). As shown best in FIGS. 4 and 5, the base 12 includes a bottom plate 14, two travel limit plates 16 and 18, and two transversely aligned, parallel body carriage guide rods 20 and 22 which are secured at each end to the travel limit plates 16 and 18. A camera body carriage 24 is slidably mounted to the body carriage guide rods 20 and 22 by four bushings 26, 28, 30 and 32. A variable speed motor (not shown) mounted between the fixed base 12 and the camera body carriage 24 moves the camera body carriage 24 over a limited range of transverse displacement. Adjustably placeable limit switches (not shown) are used to sense preset limits of transverse displacement and thereupon to stop the motor. Preferably, an electrical switching arrangement is provided which is synchronized to the shutter control of a camera 48, so that when the shutter is opened by the operator, the motor begins a constant velocity scan along the preestablished locus of displacement provided by the guide rods 20 and 22. A limit switch at the end of the scan automatically causes the shutter to close, thereby ending exposure of the film in the camera 48.

The camera body carriage 24 includes side plates 34 and 36, a rear end plate 38, a top plate 40, and two transversely aligned parallel lens assembly guide rods 42 and 44. Bushings 26 and 30 are mounted in suitable openings through the near side plate 34, and bushings 28 and 32 are mounted in suitable openings through the far side plate 36 as depicted in FIG. 4.

The bushings 26 and 28 in the side plates 34 and 36 are aligned to slide smoothly over the carriage guide rod 20, and the bushings 30 and 32 are aligned to slide smoothly over the carriage guide rod 22, in a range of transverse movement limited by the fixed transverse separation of the travel limit plates 16 and 18. The camera body carriage 24 is therefore moveable as a unit transversely on the guide rods 20 and 22.

The rear end plate 38, top plate 40 and lens assembly guide rods 42 and 44 of the camera body carriage 24 function to align and secure the side plates 34 and 36 thereof in a fixed, transversely spaced apart relationship, as shown in FIG. 4 The guide rod 42 is mounted to the side plates 34 and 36 at a height below the mounting locations of the guide rod 44. A camera body 46 of e.g. a conventional bellows camera 48 (shown diagrammatically in FIG. 5) mounts to the top plate 40.

A lens assembly carriage 50 includes a bottom plate 52 with two upwardly extending side edge portions 54 and 56 Four slide blocks 58, 60, 62 and 64 are fixedly mounted to the underside of the bottom plate 52. Spacers 66 space the slide blocks 58 and 60 away from the bottom plate 52, so that it remains level, even though the guide rod 42 is vertically aligned below the guide rod 44. The slide blocks 58 and 60 slidably engage the lens assembly guide rod 42, and the slide blocks 62 and 64 slidably engage the lens assembly guide rod 44. The range of transverse movement of the lens assembly 50 is limited by the distance between the side walls 34 and 36 of the camera body carriage 24.

A focus plate 68 is moveable over a limited adjustable range of focus movement along the optical axis 70 of the camera system 10. Thumbwheels 72 and 74 engage two longitudinally aligned, parallel, spaced apart guide rods 76 and 78 which are formed into threaded portions 80 in uppermost crossectional chords thereof. The threaded portions 80 extend longitudinally along the range of focus movement of the focus plate 68. The rods 76 and 78 are secured to the bottom plate 52 of the lens carriage assembly 50 by endblocks 82 and 84. Bushes 86 and 88 are secured to the focus plate 68 and enable it to be precisely guided over the rods 76 and 78 as one or the other of the thumbwheels 72, 74 are rotated by the camera operator.

As best seen in FIGS. 1, 5 and 6, a lens carriage follower rod 90 includes a first pivot block 92 to which the rod 90 is rotatably secured by a threaded screw 93. The rod 90 has an axis of rotation relative to the camera base carriage 24 which is precisely aligned with a film plane 94 of a film carrier 96 of the camera 48. The block 92 is fixedly secured to the camera body carriage 24 in a vertical plane in alignment with a plane passing through an optical axis 70 of the camera 48.

A follower block 98 is slidably mounted adjacent to the fixed end of the follower rod 90 and includes a cam 100 which rides in a longitudinal slot 102 of the bottomplate 52 of the carriage assembly 50. A lens assembly 104 of the camera 48 is secured to the focus plate 68 by a support member 105 and moves in accordance with movement thereof along a range of focus movement. When the lens assembly 104 of the camera 48 is focused on infinity, as shown in FIG. 1, the cam 100 precisely aligns the follower block 98 to have an axis of rotation congruent with the film plane axis 94 and with the axis of rotation of the rod 90 relative to the camera body carriage 24.

The follower rod 90 is slidably secured to a block 108 which slides upon a longitudinal rail 110 having an axis which is aligned with the longitudinal center 112 of the fixed base 12. The rail 110 is secured to the fixed base 12 and provides a reference point relative thereto. The block 108 includes a transverse guide bar 112 which is secured to the focus plate 68 of the lens carriage assembly 50 as by screws and nuts 114 extending through a longitudinal slot 116 formed in the bottom plate 52 of the lens carriage assembly 50.

As the focus plate 68 moves outwardly, the bar 112 slides the block 108 along the follower rod 90 outwardly along the centerline rail 110, thereby increasing the effective radial length of the follower rod 90. At the same time, the cam 100 causes the follower block 98 to slide outwardly on the follower rod 90. Since the follower block 98 in no longer in alignment with the film plane 94, relative movement of the camera body carriage 24 with respect to the fixed base 12 causes relative movement of the lens carriage assembly 50 with respect to the camera body carriage 24 as shown in FIG. 1. The range of relative movement thereof is a function of the focus setting of the lens assembly 104.

Figures 2, 3:
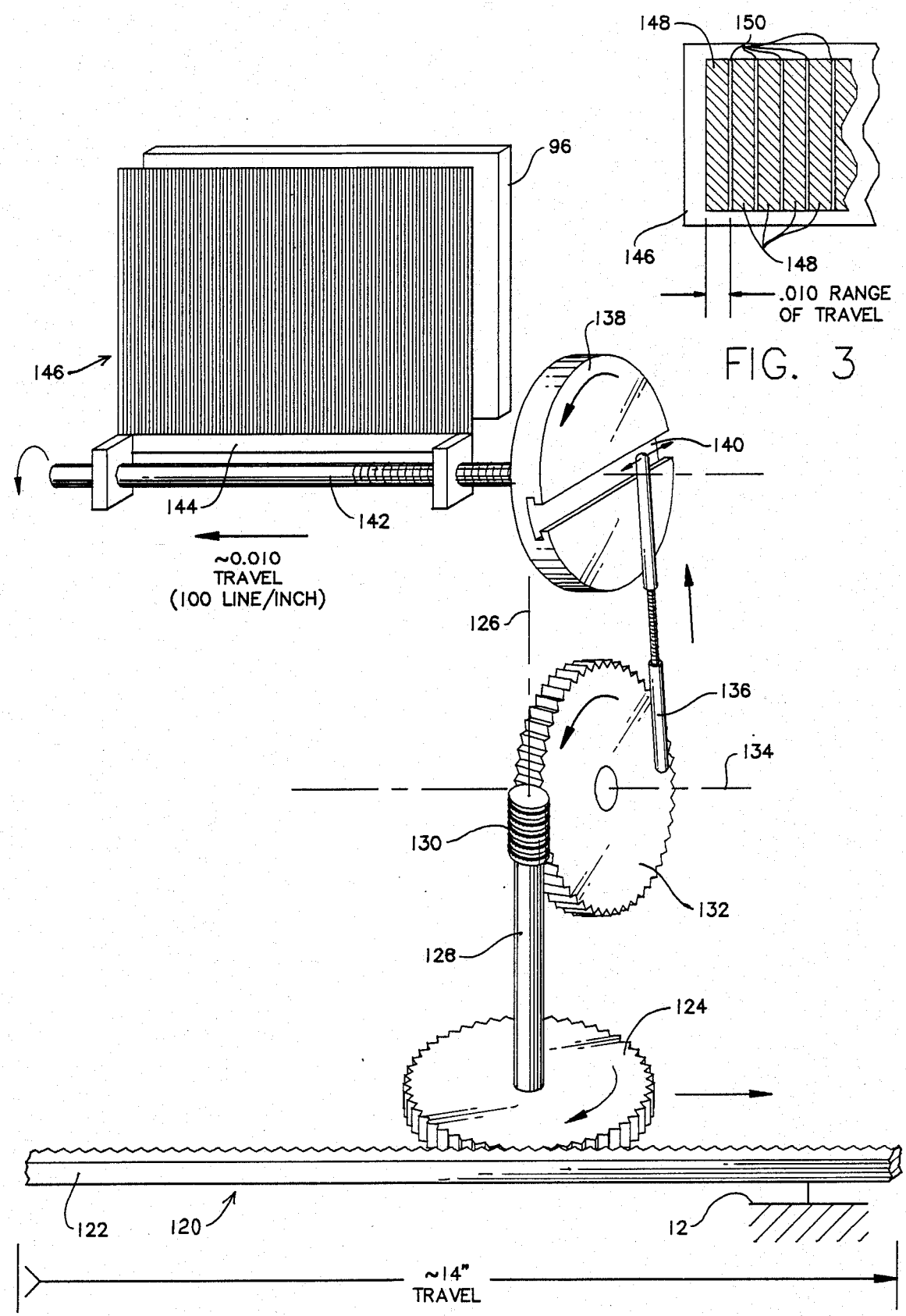
FIG. 2 is an enlarged, diagrammatic perspective of a geared mechanism for moving a lenticular screen or optical grating within the camera apparatus of FIG. 1.
FIG. 3 is an enlarged view in front elevation of a section of an optical grating of the type employed within the camera apparatus of FIG. 1.

With reference to FIGS. 2 and 3, a gear reduction mechanism 120 includes a transverse threaded rack 122 which is fixedly mounted to the fixed base 12. A first gear 124 is journalled to the camera body carriage 24 along a vertical axis of rotation 126. A shaft 128 connects the gear 124 to a worm gear 130. The worm gear 130 engages the threads of a second gear 132 which is also journalled to the camera body carriage 24 and which has a horizontal axis of rotation 134. The gear 132 connects to a length-adjustable crank rod 136 which extends upwardly to a slotted disk 138. The crank rod 136 is adjustably and pivotally connected at a radial slot 140 of the disk 138. The amount of rotation of the disk 138 resulting from lineal displacement of the rod 136 is controllable by the positioning of the rod journal in the radial slot 140. The disk 138 is fixed to an end of a threaded shaft 142 which is journaled to a lenticular grating carriage 144 which is mounted intermediate between the camera body 46 and the film carrier 96 (FIG. 5). The carriage 144 carries a lenticular array or optical grating 146.

As the camera body carriage 24 moves transversely relative to the fixed base 12, over a limited displacement of e.g. 14 inches, the gear reduction assembly 120 causes the lenticular grating carriage 144 to be displaced a very small amount which upon the number of lenses or lines per inch of the grating 146. With a 100 line per inch grating 146, the gear reduction assembly 120 would be adjusted by the operator to move the grating carriage 144 over a limited displacement of one one-hundredth of an inch, as the camera body carriage 24 moves over the 14 inch range of its limited displacement.

As illustrated in FIG. 3, the optical grating 146 includes vertically aligned opaque regions 148 which are separated by narrow transparent openings 150. In practice, it has been found that each opening 150 is approximately one tenth of the width of each opaque region 148 (9 to 1 ratio of dark to light). In practice, gratings having mircoline densities in a range between 50 and 200 lines per inch have been found most practical.

The operation of the camera system 10 is as follows: The lens assembly 104 travels transversely across the field of view thereof parallel to a selected plane of focus 152. A continuum of panoramic views is projected upon a light-sensitive film sheet 154 contained within the film carrier 96 through the optical grating 146 which is located directly adjacent to the film sheet 154. The grating 146 is typically formed by photodeposition of metal on a glass substrate and the metal line side of the substrate is placed directly against the sensitized film to minimize penumbral distortion of the incoming light waves. The lines 148 of the grating 146 are vertical, i.e. transverse to the locus of movement of the camera body carriage 24.

During a film exposure period, the camera body carriage consistently moves along its locus of transverse limited displacement, e.g. 14 inches. When focused at an infinity setting 156, the lens assembly 104 traverses the same distance as does the camera body carriage 24, and there is no relative displacement therebetween. When a one-to-one image ratio is reached, as at the setting 158, the traverse of the lens assembly carriage 50 and lens assembly 104 is one half the distance of traverse of the camera body carriage 24 and camera body 46, e.g. 7 inches. This arrangement provides for retention of maximum depth of field with minimum softening of detail in the composite picture.

The optical system is based upon the Gaussian formula:

$$\frac{1}{F} = \frac{1}{P} + \frac{1}{Q}$$

Where:
 F equals the focal length of the camera lens assembly,
 P equals object distance (distance from the front nodal point to the selected object plane), and
 Q equals image distance (distance from the rear nodal point to the film plane).

A wide variety of focal length lenses may be used on the camera 48. It is necessary, however, that in each case the rear nodal point of the lens be placed over the fulcrum (block 108) of the camera system 10 at midpoint of transverse scan displacement range.

Exposure period traverse time for the camera body carriage 24 is typically from three seconds to 30 seconds. The smallest f/stop possible may normally be used in order to achieve greatest depth of field. The exposure period traverse time may be selected, depending upon the speed of the film 134 and with attention given to compensation for the masking ratio of the optical grating 146 of 9 to 1 (equivalent to 2.5 f/stop openings).

As will be appreciated by those skilled in the art, the camera system 10 works most effectively in providing three dimensional picture images when the greatest depth of field is achievable. This is so that not only images in the foreground will be in focus, but also images in the background regions of the field of view will be in focus.

It has been discovered by the inventors that in certain circumstances of close up focus, excessive parallax results in smearing of important foreground and background features within the field of view. In order to minimize smearing from excessive parallax, the longitudinal traverse of the camera body carriage 24 relative to the fixed base 12 is controllable, as by transverse placement of the limit switches controlling the motor driving the carriage 24, so that the range of displacement may be selected by the photographer within e.g. 3–14 inches. At the same time, the f/stop setting may also be adjusted by the photographer in order to obtain subjectively the most satisfactory results.

The relief image resolved by the moving grating 146 may be pseudoscopic or stereoscopic. This sense of the image depends upon the direction of the relative movements of the optical grating 146 and the lens carriage 50 during the exposure period traverse time. When the elements 146 and 50 move in the same direction relative to the camera body carriage 24, the relief image formed on the film will be pseudoscopic (reverse relief). When the elements 146 and 50 move in opposite directions relative to the carriage 24, the relief image exposed onto the film will be stereoscopic.

The radial slot 140 of the disk 138 in the gear reduction assembly 120 extends reduction assembly extends over the entire diameter of the disk. If the connecting rod 136 is disposed on one side of the axis of the shaft 142, the grating 146 will move in one direction relative to the base 12. However, if the connecting rod 136 is disposed on the other side of the axis of the shaft 142, the grating 146 will move in the opposite direction. The adjustment setting of the connecting rod journal within the slot 140 of the disk 136 is controlled by the operator and thereby determines whether the relief image will be stereoscopic or pseudoscopic.

After processing of the exposed film, it may be viewed through an overlayed viewing screen, i.e. a parallax grating, or a lenticular screen. The composite picture thus produced presents both left and right eye images, creating a three-dimensional representation. The panoramic quality is within a wide observer space of about 30 degrees.

While mechanical gear reduction assemblies and linkages have been described as the presently preferred embodiment of the present invention, it will be appreciated by those skilled in the art that servo mechanisms driven by relative position sensors, such as optical encoders, etc. may be used to provide the requisite relative motions of the carriages 24 and 50 with respect to the fixed base 12. In addition, such servo systems are readily providable by those skilled in the art in order to provide pan and tilt adjustments for the camera 48. Programmable microprocessor controllers are particularly well suited for controlling such servo systems within the optical environment of the inventive camera system.

Having thus described an embodiment of the present invention, it will now be appreciated that the objects of the invention have been fully achieved, and it will be understood by those skilled in the art that many changes in construction and widely differing embodiments and applications will suggest themselves without departing from the spirit and scope of the invention, as more particularly defined by the following claims. The disclosures and the description herein are purely illustrative and are not intended to be in any sense limiting.

We claim:

1. An improved camera apparatus for three-dimensional photography including a stationary frame, a camera body with a film holder for holding photographic film in a film plane and a controllable shutter for exposing film held in the film holder at a film plane, and a focusable lens assembly attached to the body and including a lens, the improved camera further including:

camera body carriage means moveably mounted to the stationary frame, the carriage means for securing the camera body thereto, the camera body carriage means being moveable along a first limited range of substantially linear movement transverse to the field of view of the camera lens, vertical grating means having a predetermined number of equally spaced vertical light transmitting means and pitch defining the spacing therebetween said grating means being disposed within the camera body immediately in front of the film holder and moveable over a second limited range of transverse movement, lenticular grating movement control means responsive to the relative position of the camera body carriage means with respect to the base for moving the vertical grating means relative to the film holder over the second limited range of movement as the camera body carriage means moves throughout its range of substantially linear movement, lens assembly carriage means mounted to be moveable relative to the stationary frame, the lens assembly carriage means for securing the lens assembly and being transversely moveable over a third limited range of transverse movement relative to the base, and lens assembly carriage control means responsive to focus position of the main lens relative to the film plane and responsive to the relative position of the camera body carriage means with respect to the base for moving the lens assembly carriage means relative to the film holder over the third limited range of movement as the camera body carriage means moves throughout the first limited range of substantially linear movement, the relative movement between the lens assembly carriage means and the film holder being dependent upon the focus setting of the lens assembly means in a range between zero relative movement at an infinity focus setting of the lens and a maximum range of relative movement at a maximum close up focus setting of the lens.

2. The camera apparatus set forth in claim 1 wherein the lens assembly carriage control means automatically varies the dimension of the third limited range of movement in accordance with focus position of the main lens relative to the film plane.

3. The camera apparatus set forth in claim 1 wherein said grating movement control means may be preset with a value related to the pitch of the grating.

4. The camera apparatus set forth in claim 3 wherein said grating movement control means comprises a first rack transversely formed in said stationary frame extending throughout the first limited range of substantially linear movement transverse to the field of view of the camera, and gear reduction means mating with said rack and journalled to said camera body carriage means and connected to move said vertical grating means over said second limited range of movement.

5. The camera apparatus set forth in claim 4 wherein said movement control means comprises a radially adjustable linear movement connecting rod within said gear reduction means and a disk having a diametral slot in which a journal for said rod may be set, thereby enabling the operator to set the direction and amount of displacement over said second range.

6. The camera apparatus set forth in claim 1 wherein said lens assembly carriage control means comprises a mechanical pivoting linkage arrangement between said stationary frame, said camera body carriage means and said lens assembly carriage means whereby focus position of said lens assembly operates said mechanical pivoting linkage arrangement for moving the lens assembly carriage means relative to the film holder over the third limited range of movement as the camera body carriage means moves throughout the first limited range of substantially linear movement.

7. The camera apparatus set forth in claim 6 wherein said mechanical pivoting linkage arrangement includes a follower rod having one end thereof fixedly journalled for rotation in a horizontal plane to the camera body carriage means with an axis of rotation lying in said film plane, and having another end thereof slidably journalled through a block which follows a guide rail parallel to a focus locus of said camera in accordance with focus position of said focusable lens assembly.

8. The camera apparatus set forth in claim 1 further comprising traverse control means for controlling the distance of said first limited range of substantially linear movement of the camera body carriage means relative to the stationary frame, thereby to minimize parallax distortion.

9. The camera apparatus set forth in claim 8 wherein said traverse control means is presettable so that said first limited range of substantially linear movement may be set between three and fourteen inches.

* * * * *